United States Patent [19]

Ogoe et al.

[11] Patent Number: 4,826,900

[45] Date of Patent: May 2, 1989

[54] IGNITION RESISTANT MODIFIED CARBONATE POLYMER COMPOSITION

[75] Inventors: Samuel A. Ogoe, Angleton; Thoi H. Ho, Lake Jackson, both of Tex.

[73] Assignee: The Dow Chemical Company, Midland, Mich.

[21] Appl. No.: 175,813

[22] Filed: Mar. 31, 1988

[51] Int. Cl.$^4$ .............................................. C08L 69/00
[52] U.S. Cl. ................................. 524/126; 204/331.14; 204/331.15; 204/176.1; 524/133; 524/135; 524/147; 524/151; 524/154; 524/537; 525/146; 525/147
[58] Field of Search ............... 525/146, 147, 468, ; 524/126, 537, 133, 135, 147, 151, 154

[56] References Cited

U.S. PATENT DOCUMENTS

| | | | |
|---|---|---|---|
| 4,110,299 | 8/1978 | Mark | 260/37 |
| 4,208,489 | 6/1980 | Schmidt et al. | 525/146 |
| 4,223,100 | 9/1980 | Reinert | 525/146 |
| 4,407,995 | 10/1983 | Dick | 524/104 |
| 4,481,338 | 11/1984 | Serini et al. | 525/394 |
| 4,626,563 | 12/1986 | Ogoe et al. | 524/168 |
| 4,692,488 | 9/1987 | Kress et al. | 524/139 |

*Primary Examiner*—Theodore E. Pertilla
*Attorney, Agent, or Firm*—John A. Langworthy; B. G. Colley

[57] ABSTRACT

An ignition resistant carbonate polymer composition comprising a mixture of one or more carbonate polymers, and a high elastic memory polytetrafluoroethylene having a heat shrinkage equal to or greater than 15% with or without one or more organo phosphorous compounds.

19 Claims, No Drawings

IGNITION RESISTANT MODIFIED CARBONATE POLYMER COMPOSITION

BACKGROUND OF THE INVENTION

This invention relates to modified carbonate polymer compositions containing polytetrafluoroethylene with and without other additives which act to reduce the susceptibility of such polymer to burning or at least to minimize the effects of dripping of molten polymer when exposed to fire conditions.

Carbonate polymers derived from reactions of dihydroxy organic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance, and excellent electrical properties are required.

Unfortunately, however, these polymers exhibit a brief but definite burning time when contacted with an open flame. More importantly, as is often the case, the carbonate polymers contain stabilizers and other additives which are often more combustible than the unmodified carbonate polymer. As a result, the modified carbonate polymers frequently exhibit sustantially poorer resistance to combustion than do the unmodified carbonate polymers.

In attempts to increase the combustion resistance of carbonate polymers, it has been a common practice to incorporate monomeric phosphites, phosphoric acid esters, thiophosphoric acid esters containing halogenated alkyl radicals, and halogenated organic compounds into the carbonate polymer. However, in order to obtain any noticeable improvement in combustion resistance, these additives have been employed in such large quantities that they often adversely affect many of the desirable physical and mechanical properties of the carbonate polymer.

In U.S. Pat. No. 4,626,563 fire retardant polycarbonates comprising metal salts of sulfimides, chlorinated or brominated aromatic compounds, metal salts of inorganic acids, bisphenol polycarbonates and fibril forming polytetrafluoroethylene (PTFE) are disclosed and claimed. Control 2 therein shows that the addition of 0.5% of a fibril forming polytetrafluoroethylene to the heat stabilized polycarbonate only gave a UL-94 (1/16" thickness) rating of V-2. This is apparently due to the use of more severe extrusion and molding temperatures (302° C.) which destroys the ability of polytetrafluoroethylene to contract upon exposure to the flame and thus the anti-drip characteristic is lost.

U.S. Pat. No. 4,223,100 shows in Table II, Composition 20, a 0.5% PTFE/polycarbonate composition that has a UL-94 (⅛" thickness) rating of $V_1$-$V_0$ and fails the UL-94 test at the 1/16" thickness. Again this is believed to be due to the 300° C. molding temperature.

U.S. Pat. No. 4,110,299 shows in the Table a 0.1% PTFE/polycarbonate composition that fails the UL-94 test due to the 315° C. molding temperature and also low PTFE concentration.

SUMMARY OF THE INVENTION

The present invention is an ignition resistant thermoplastic composition having a melt flow rate from 1 to 90 grams per 10 minutes and a UL-94 (1/16") rating of V-0 when extruded and/or molded at a suitable temperature with the proper amount of polytetrafluoroethylene consisting essentially of (A) an amount of a high elastic memory polytetrafluoroethylene having a heat shrinkage equal to or greater than 15% whereby the amount used is selected to achieve said V-0 rating, and (B) the remainder being an aromatic carbonate polymer.

Also included in this invention is a method for preparing an ignition resistant thermoplastic composition, and the composition prepared by such method, having a melt flow rate from 1 to 90 grams/10 minutes and a UL-94 (1/16") rating of V-0 comprising the steps of (A) preparing a mixture of an aromatic carbonate polymer with a high elastic memory polytetrafluoroethylene having a heat shrinkage equal to or greater than 15% whereby the amount of polytetrafluoroethylene used is selected to achieve said V-0 rating, and (B) extruding and/or molding said mixture at a temperature from about 200° C. to about 315° C.

It has been surprisingly discovered that contrary to the teachings of the prior art, the incorporation of halogenated compounds and alkali metal salts into carbonate polymers is not needed to produce a UL-94 (1/16") V-0 rating. It is well known that the use of these halogenated compounds and alkali metal salts contribute to the relatively poor hydrolytic stability, color stability, UV stability and heat distortion performance of carbonate polymers containing them. Thus, the compositions of this invention have an unique advantage over the prior art.

The ignition resistant carbonate polymer compositions of the present invention exhibit surprisingly high resistance to combustion and/or ignition and are suitably employed in most applications in which polycarbonates have been previously utilized. Applications of particular interest for the utilization of the said carbonate polymer compositions of this invention are pigmented and/or colored carbonate polymers useful as automobile parts, e.g., air filters, fan housings, exterior components, housings for electrical motors, appliances, business and office equipment, photographic equipment, and aircraft applications.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)-alkylidenes (often called bisphenol-A type diols), including their aromatically and aliphatically substituted derivatives such as disclosed in U.S. Pat. Nos. 2,999,835; 3,038,365, 3,334,154, and 4,299,928; and carbonate polymers derived from other aromatic diols such as described in U.S. Pat. No. 3,169,121.

It is understood, of course, that the carbonate polymer may be derived from (1) two or more different dihydric phenols or (2) one or more dihydric phenols and one or more hydroxy- or acid-terminated reactants such as dicarboxylic acids, or alkylene glycols in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known; for example, several suitable methods are disclosed in the aforementioned patents which are hereby incorporated by reference in their entirety.

Suitable polytetrafluoroethylene polymers for use in this invention are those adapted to form a fibril structure to stabilize the polymer under molten conditions. Such polymers are generally disclosed by U.S. Pat. Nos. 3,005,795, 3,671,487 and 4,463,130. The teachings of these patents are incorporated herein by reference. In addition, the polytetrafluoroethylene (PTFE) polymers must have a high elastic memory and/or have a heat shrinkage equal to or greater than 15% when tested under the following conditions. A polycarbonate resin with 0.5% of PTFE was injection molded into bars having the dimensions of 5"×½"×1/16" and heated at 160° C. for 1 hour. The shrinkage was measured and compared to the length of the sample before and after heating. A 75 ton Newbury molding machine is used. The molding conditions are:

| Barrel Temperature | 250° C. |
| Mold Temperature | 65° C. |
| Screw Speed | 150 rpm |
| Pressure | 1000 psi |

The results of several tests are shown in Table I.

TABLE 1

Relationship Between the Percent Shrinkage and UL-94 for Different Polytetrafluoroethylenes (PTFE)

| Run | PTFE* | Percent Shrinkage | UL-94 at 1/16" |
|---|---|---|---|
| 1 | 8 | 1 | V-2 |
| 2 | DXL-6000 | 1 | V-2 |
| 3 | 6C | 25 | V-0 |
| 4 | 60 | 25 | V-0 |
| 5** | 6C | 8 | V-2 |
| 6** | 60 | 6 | V-2 |
| 7 | 64 | 15 | V-0 |
| 8 | 6CN | 24 | V-0 |
| 9 | 65 | 22 | V-0 |
| 10 | 67 | 22 | V-0 |

*Various grades of Teflon ™ from Du Pont
**Molding temperature 325° C.

Table 1 shows that only high elastic memory PTFE is effective as an ignition resistant (IR) additive. The high elastic memory PTFE helps the polycarbonate sample contract upon exposure to a flame source and thus imparts ignition resistance to the polycarbonate. The relationship between the % shrinkage and the UL-94 test is also shown in Table 1. The PTFE that gives a polycarbonate shrinkage greater than 15% is effective as an IR additive. Some examples of PTFE that have high elastic memory such as Teflon ™ 6C, 60, 64, 6CN, 65, and 67 are shown in Table 1. The PTFE that have a low percent of shrinkage such as Teflon ™ DXL-6000 and Teflon ™ 8 did not impart ignition resistance to the polycarbonate. Note, that if the molding temperature is higher than the melting point of PTFE the elastic memory of PTFE is significantly reduced.

As previously mentioned, the compositions of this invention advantageously employ an organo phosphorous compound to aid in preventing polymer degradation under molding conditions and increasing the ignition resistance. Suitable organo phosphorous compounds are those which include the organo phosphates, the organo phosphonites, the organo phosphines and the organo phosphites. Preferred organo phosphorus compounds are those represented by the formulae:

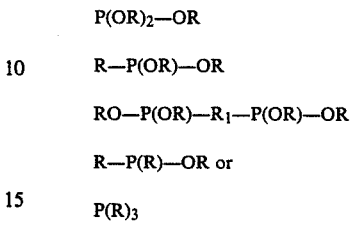

wherein R is independently unsubstituted or substituted aryl, alkyl, cycloalkyl, aralkyl, or alkaryl radicals containing one or more carbon atoms and $R_1$ is a 4,4'biphenyl radical. The preferred organo phosphorous compound is tetrakis(2,4-di-t-butylphenyl)biphenylene diphosphonite. Suitable organo phosphorus compositions are disclosed in U.S. Pat. Nos. 4,066,611; 4,073,769; 4,076,686; 4,088,709; 4,427,813; and 4,254,014. The teachings of these patents are incorporated herein by reference.

The carbonate polymer compositions of the present invention are suitably prepared by combining the ingredients in effective amounts using any of a variety of blending procedures conventionally employed for polymer blends. For example, dry particulates of the carbonate polymer, and the other additives can be dry blended and the resulting dry blend extruded into the desired shape. The temperature range over which the carbonate polymer compositions of the present invention may be extruded and/or molded is from about 200° C. to about 315° C., and preferably in the range from about 240° C. to about 315° C.

The amount of the high elastic memory polytetrafluoroethylene is preferably in the range from about 0.01 to about 10 percent and preferably in the range from about 0.1 to about 5 percent by weight based on total composition weight. However, it is to be understood that greater or lesser amounts can be used under various conditions such as the type of polytetrafluorethylene used, the process temperatures, and the melt flow rate or molecular weight of the carbonate polymers used. This is illustrated by Tables 1, 4, and 5 hereinafter.

Where employed, the additional components, organophosphorous compounds, are suitably present in sufficient amounts to stabilize the polymer in the melt, i.e, lack of color formation or molecular weight degradation under molding conditions, and melt stability. Preferred amounts are preferably from about 0.005 to about 1% by weight of organophosphorous compounds.

In addition, other additives can be included in the modified carbonate polymer composition of the present invention such as fillers (i.e., glass fibers), pigments, dyes, antioxidants, heat stabilizers, ultraviolet light absorbers, mold release agents and other additives commonly employed in carbonate polymer compositions.

The melt flow rate of the polycarbonate resins were measured according to ASTM D-1238, condition zero.

The following examples are given to further illustrate the invention and should not be construed as limiting its scope. In the following examples, all parts and percentages are by weight unless otherwise indicated.

EXAMPLE 1

An ignition resistant polycarbonate having a melt flow rate of 15 gm/10 minute was prepared by adding 0.3% of a commercially available polytetrafluoroethylene (Teflon TM 6C from Du Pont) to polycarbonate pellets (Calibre TM 300-15 a trademark of The Dow Chemical Company). The additive and polycarbonate pellets are blended in a Lightnin blender for 1 minute with agitation. The resultant blended materials are fed to a 30 mm twin screw extruder having a 250° C. barrel temperature. The extruded pellets are dried in an oven for 3 hours at 125° C. The dried pellets were molded into 5"×½"×1/16" bars at 250° C. for flammability. The test results are shown in Table 2.

CONTROL A

The procedure for Example 1 is repeated omitting the Teflon TM 6C.

EXAMPLE 2

The procedure for Example 1 is repeated using 0.5% Teflon TM 6C from Du Pont.

EXAMPLE 3

The procedure for Example 1 is repeated using 0.3% Teflon TM 6CN.

EXAMPLE 4

The procedure for Example 1 is repeated using 0.05% tetrakis(2,4-di-t-butylphenyl)biphenylene diphosphonite (PEPQ).

EXAMPLE 5

The procedure for Example 1 is repeated using 0.05% PEPQ and 0.5% Teflon TM 6C.

EXAMPLE 6

The procedure for Example 1 is repeated using 0.5% Teflon TM 6C and 40 MFR base polycarbonate.

Control B

The procedure for Example I is repeated using 40 MFR base polycarbonate and no Teflon TM.

EXAMPLE 7

The procedure for Example 1 is repeated using 40 MFR base polycarbonate, 0.5% Teflon TM 6C, 0.05% PEPQ, and 1% TiO$_2$.

Control C

The procedure for Example 1 is repeated using 80 MFR base polycarbonate and no Teflon TM 6C.

EXAMPLE 8

The procedure for Example 1 is repeated using 80 MFR polycarbonate, 0.3% Teflon TM 6C, and 0.05% PEPQ.

EXAMPLE 9

The procedure for Example 1 is repeated using 80 MFR polycarbonate, 0.5% Teflon TM 6C, and 0.05% PEPQ.

Runs 1–4, and 7–10

The procedure for Example 1 is repeated using different kinds of polytetrafluoroethylene as described in Table 1. The amount of polytetrafluoroethylene is 0.5%.

Run 5

The procedure for Example 1 is repeated using 0.5% of Teflon TM 6C and molding at 325° C.

Run 6

The procedure for Example 1 is repeated using 0.5% of Teflon TM 6C and molding temperature at 325° C.

Runs 11–14

The procedure for Example 1 is repeated using 40 MFR polycarbonate 0.5% Teflon TM 6C and different molding temperatures as described in Table 4.

Runs 15–22

The procedure for Example 1 is repeated using different amounts of Teflon TM 6C as described in Table 5.

Runs 23–24

The procedure for Example 1 is repeated using 0.5 and 2.0% of Teflon TM 6C, a molding temperature of 315° C., and a polycarbonate having a melt flow rate of 3. The results are set forth in Table 6.

Runs 25–26

The procedure for Example 1 is repeated using 0.5 and 2.0% of Teflon TM 6C, a molding temperature of 300° C., and a polycarbonate having a melt flow rate of 6.6. The results are set forth in Table 6.

TABLE 2

| Sample | Ignition Resistance for 15 MFR Resin | | |
|---|---|---|---|
| | UL-94 Test (1/16") Avg Time (sec.) | Number of Drips | Rating |
| Control A 15 MFR base polymer | 10.5 | 5/5 | V-2 |
| Ex. 1 Control A + 0.3% Teflon 6C | 3.5 | 0/5 | V-0 |
| Ex. 2 Control A + 0.5% Teflon 6C | 2.5 | 0/5 | V-0 |
| Ex. 3 Control A + 0.3% Teflon 6CN | 4.0 | 0/5 | V-0 |
| Ex. 4 Control A + 0.3% Teflon 6C + 0.05% PEPQ | 1.5 | 0/5 | V-0 |
| Ex. 5 Control A + 0.5% Teflon 6C + 0.05% PEPQ | 1.1 | 0/5 | V-0 |

Table 2 shows that the high elastic memory polytetrafluoroethylene (PTFE) such as Teflon TM 6C, Teflon TM 6CN from Du Pont improves the ignition resistance of PC. The PC sample with PTFE gives V-0 down to 1/16" in UL-94 test. The addition of PEPQ, a heat stabilizer, improves the burn time.

TABLE 3

Ignition Resistance for 40 MFR and 80 MFR Resins

| Sample | UL-94 Test (1/16") Avg Time (sec.) | Number of Drips | Rating |
|---|---|---|---|
| Control B (40 MFR base polymer) | 8.0 | 5/5 | V-2 |
| Ex. 6 Control B + 0.5% Teflon 6C | 4.0 | 0/5 | V-0 |
| Ex. 7 Control B + 0.5% Teflon 6C 0.05% PEPQ + 1% TiO₂ | 2.0 | 0/5 | V-0 |
| Control C (80 MFR base polymer) | 5.0 | 5/5 | V-2 |
| Ex. 8 Control C + 0.3% Teflon 6C + 0.05% PEPQ | 1.8 | 0/5 | V-0 |
| Ex. 9 Control C + 0.5% Teflon 6C + 0.05% PEPQ | 1.0 | 0/5 | V-0 |

Table 3 shows that a high elastic memory PTFE also is effective for high melt flow rate polycarbonates. Ex. 7 shows that heat stabilizers and pigments can also be used without sacrificing ignition resistance properties.

TABLE 4

Effect of Barrel Temperature on Ignition Resistance of Polycarbonates

| | | UL-94 test (1/16") | |
|---|---|---|---|
| Run | Barrel Temperature (°C.) | Avg time (sec.) | Number of Drips | Rating |
| 11 | 250 | 0.7 | 0/5 | V-0 |
| 12 | 275 | 1.9 | 0/5 | V-0 |
| 13 | 300 | 1.4 | 0/5 | V-0 |
| 14 | 325 | 5.9 | 5/5 | V-2 |

The results in Table 4 show that the molding temperature has significant effects on the ignition resistance. When the sample is molded higher than 325° C., the melting point of PTFE, the PTFE lost its elastic memory and the sample is no longer ignition resistant.

TABLE 5

Effect of the Polytetrafluoroethylene (PTFE) Amount on the Shrinkage and Ignition Resistance of Polycarbonates

| Run | Amount of PTFE (Teflon ™ 6C) | % Shrinkage | UL-94 at 1/16" |
|---|---|---|---|
| 15 | 0.1 | 5 | V-2 |
| 16 | 0.2 | 8 | V-2 |
| 17 | 0.3 | 15 | V-0 |
| 18 | 0.5 | 25 | V-0 |
| 19 | 0.9 | 43 | V-0 |
| 20 | 2.0 | 50 | V-0 |
| 21 | 4.0 | 59 | V-0 |
| 22 | 8.0 | 56 | V-0 |

The polycarbonate used in this study had a MFR of 15. The molding temperature and extrusion temperature was 250° C. Table 5 shows that the percent shrinkage and IR properties increases with increasing amount of PTFE.

TABLE 6

Ignition Resistant Low Melt Flow Rate Polycarbonate

| Run | Molding Temperature (°C.) | PC MFR | Amount of PTFE | UL-94 Test (1/16") Rating |
|---|---|---|---|---|
| 23 | 315 | 3 | 0.5 | HB |
| 24 | 315 | 3 | 2.0 | V-0 |
| 25 | 300 | 6.6 | 0.5 | V-2 |
| 26 | 300 | 6.6 | 2.0 | V-0 |

PC MFR = polycarbonate melt flow rate
PTFE = polytetrafluoroethylene

Table 6 shows that ignition resistant polycarbonate (V-0 at 1/16") with low melt flow rate can be prepared with the addition of high elastic memory PTFE. However, since a low melt rate requires high processing temperatures, a high amount of PTFE is needed.

U.S. Pat. Nos. 4,110,299, 4,223,100, 4,626,563 taught that the composition of 0.1-0.5% of PTFE with polycarbonate fails the UL-94 test at 1/16" thickness. The results in Table 6 indicate that by increasing the amount of PTFE the polycarbonate having UL-94 rating of V-0 at 1/16" can be prepared.

We have demonstrated that the high elastic memory of PTFE, i.e. the ability to contract or shrink polycarbonate gives the ignition resistant properties to polycarbonate. The elastic memory is dependent on the type of PTFE (Table 1), the amount of PTFE (Table 5), the processing conditions (Table 4), and the melt flow rate of the polycarbonate. By selecting the above proper conditions, an ignition resistant polycarbonate having a UL-94 rating of V-0 at 1/16" can be obtained.

We claim:

1. An ignition resistant thermoplastic composition having a melt flow rate from 1 to 90 grams/10 minutes and a UL-94 (1/16") rating of V-0 when extruded and/or molded at a suitable temperature with the proper amount of polytetrafluoroethylene consisting essentially of
   (A) an amount of a high elastic memory polytetrafluoroethylene having a heat shrinkage equal to or greater than 15% whereby the amount used is selected to achieve said V-0 rating, and
   (B) the remainder being an aromatic carbonate polymer.

2. An ignition resistant thermoplastic composition having a melt flow rate from 1 to 90 grams/10 minutes and a UL-94 (1/16") rating of V-0 when extruded and/or molded at a temperature from about 200° C. to about 315° C. consisting essentially of
   (A) about 0.01 to about 10% by weight of a high elastic memory polytetrafluoroethylene having a heat shrinkage equal to or greater than 15% and
   (B) about 99.99 to about 90% by weight of an aromatic carbonate polymer.

3. The composition of claim 1 wherein the melt flow rate is from 22 to 85 grams/10 minutes.

4. The composition of claim 1 which has in addition about 0.005 to about 1% by weight of one or more organo phosphorous compounds represented by the formulae:

P(OR)₂—OR

R—P(OR)—OR

RO—P(OR)—R₁—P(OR)—OR

R—P(R)—OR or $$P(R)_3$$

wherein R is independently unsubstituted or substituted aryl, alkyl, cycloalkyl, aralkyl, or alkaryl radicals containing one or more carbon atoms and $R_1$ is a 4,4'biphenyl radical.

5. The composition of claim 4 wherein the organo phosphorous compound has the formula $$RO-P(OR)-R_1-P(OR)-OR$$

wherein R is independently unsubstituted or substituted aryl, alkyl, cycloalkyl, aralkyl, or alkaryl radicals containing one or more carbon atoms and $R_1$ is a 4,4'biphenyl radical.

6. The composition of claim 5 wherein the organo phosphorous compound is tetrakis(2,4-di-t-butylphenyl)biphenylene diphosphonite.

7. A method for preparing an ignition resistant thermoplastic composition having a melt flow rate from 1 to 90 grams/10 minutes and a UL-94 (1/16") rating of V-0 comprising the steps of
   (A) preparing a mixture of an aromatic carbonate polymer with a high elastic memory polytetrafluoroethylene having a heat shrinkage equal to or greater than 15% whereby the amount of polytetrafluoroethylene used is selected to achieve said V-0 rating, and
   (B) extruding and/or molding said mixture at a temperature from about 200° C. to about 315° C.

8. The method as set forth in claim 7 wherein the temperature is in the range from about 240° C. to about 315° C.

9. The method as set forth in claim 7 wherein the amount of said polytetrafluoroethylene is about 0.01 to about 10% by weight.

10. A method for preparing an ignition resistant thermoplastic composition having a melt flow rate from 1 to 90 grams/10 minutes and a UL-94 (1/16") rating of V-0 comprising the steps of
    (A) preparing a mixture of
       (i) a high elastic memory polytetrafluoroethylene having a heat shrinkage equal to or greater than 15%,
       (ii) an aromatic carbonate polymer, and
       (iii) one or more organo phosphorous compounds represented by the formulae:

$$P(OR)_2-OR$$

$$R-P(OR)-OR$$

$$RO-P(OR)-R_1-P(OR)-OR$$

$$R-P(R)-OR \text{ or}$$

$$P(R)_3$$

wherein R is independently unsubstituted or substituted aryl, alkyl, cycloalkyl, aralkyl, or alkaryl radicals containing one or more carbon atoms and $R_1$ is a 4,4'biphenyl radical, and
    (B) extruding and/or molding said mixture at a temperature from about 200° C. to about 315° C.

11. The method as set forth in claim 10 wherein the temperature is in the range from about 240° C. to about 315° C.

12. The composition produced by the method of claim 7.

13. The composition produced by the method of claim 8.

14. The composition produced by the method of claim 9.

15. The composition produced by the method of claim 10.

16. The composition produced by the method of claim 11.

17. The composition of claim 1 wherein said polytetrafluoroethylene is that which is adapted to form a fibril structure.

18. The composition of claim 2 wherein the amount of said polytetrafluoroethylene is about 0.1 to about 5% by weight and the amount of said carbonate polymer is about 99.9 to about 95% by weight.

19. The method of claim 9 wherein the amount of said polytetrafluoroethylene is about 0.1 to about 5% by weight.

* * * * *